Aug. 4, 1964  R. G. MAINWARING  3,143,322
AIRCRAFT LANDING DEVICE
Filed March 28, 1961
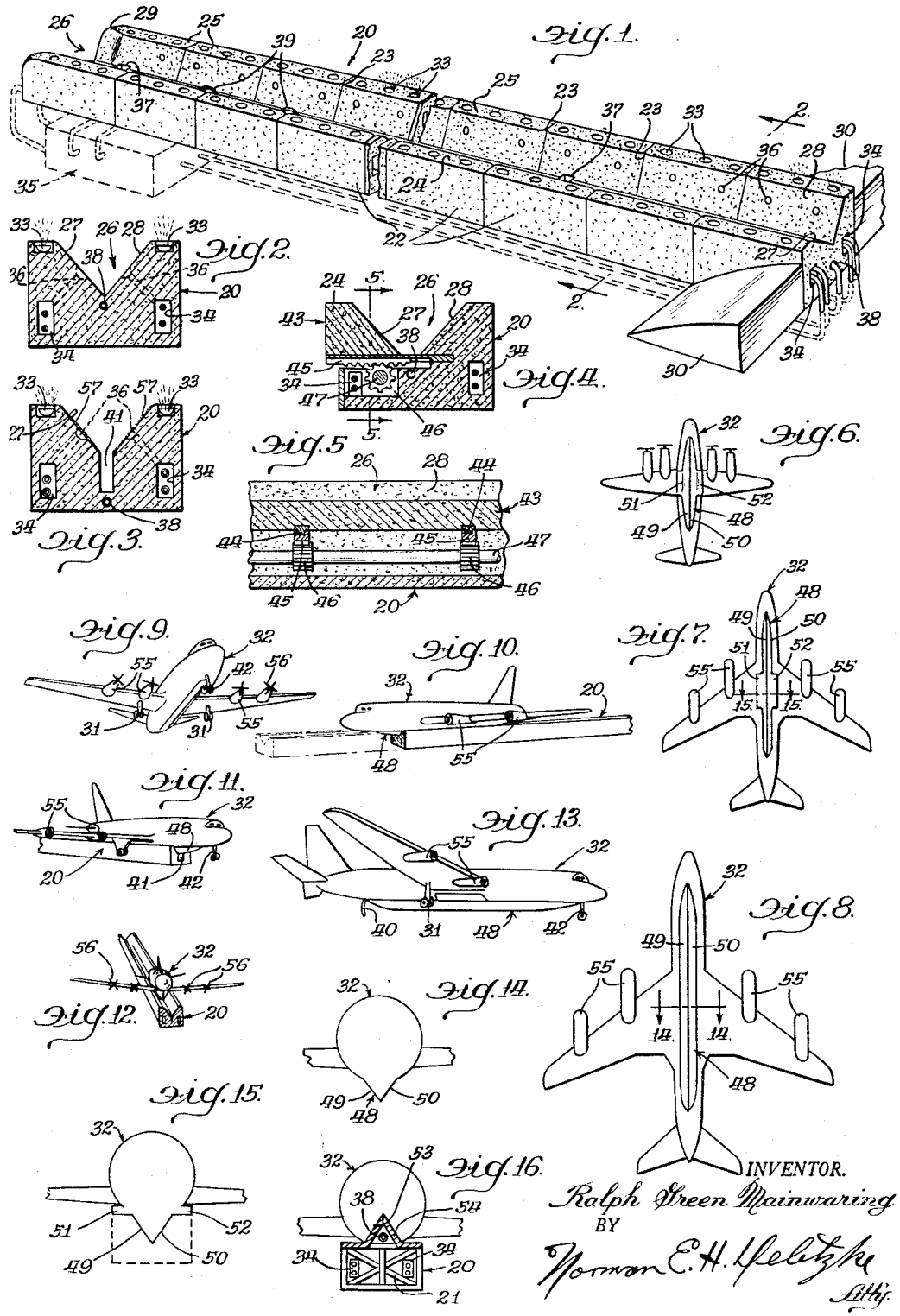
INVENTOR.
Ralph Green Mainwaring
BY
Norman E. H. Welitzki
Atty.

United States Patent Office 3,143,322
Patented Aug. 4, 1964

3,143,322
AIRCRAFT LANDING DEVICE
Ralph Green Mainwaring, 3503 Oak Ave.,
Brookfield, Ill.
Filed Mar. 28, 1961, Ser. No. 98,941
18 Claims. (Cl. 244—114)

This invention pertains to aircraft landing and take-off devices adapted particularly for use in the emergency landing and take-off of aircraft.

More specifically stated this invention relates to improvements in landing and take-off runways for aircraft and in coacting parts of aircraft landing thereon, whereby, upon the failure of conventional landing gear, the aircraft may, during landing or take-off operations, be supported upon and stabilized by and guided by the coaction established during such landing or take-off operations between the improved non-movable surface parts of the body of the aircraft and complementary surface parts of the improved runway.

Still more specifically stated, this invention is particularly well adapted, as for example, for use in the emergency landing of aircraft which has been disabled by virtue of the failure of conventional landing gear to operate normally, and to accomplish such emergency landing without undue risk of damage to the fuselage, wings or motors, etc., of the aircraft, or injury to the occupants of the aircraft.

This invention also relates to improvements in the heating, lubricating, illuminating, adjustment, and sectional construction of the improved runway.

In a broad concept, this invention comprehends an improved landing and take-off arrangement for aircraft which may supplement conventional arrangements for such purposes, and wherein the fuselage of the aircraft is provided on its underside with an elongated and reinforced surface or surfaces, having, for example, a V-shaped cross section, which is complementary to a correspondingly shaped surface or surfaces in the upper portion of an elongated landing strip or runway which is narrower than the spacing between the inner motors on the wings of the aircraft and which is elevated a sufficient distance to preclude engagement between the ground and the wings, motors, propellers or the conventional landing gear of the aircraft during landing or take-off of the aircraft.

It is the frequent practice, in the operation of aircraft which has developed defective operating conditions with respect to its landing gear, to attempt to land the aircraft by sliding the underside of the aircraft on greased or otherwise lubricated conventional runways, in an emergency landing operation. Such procedures are usually a last resort effort to save the lives of the occupants of the aircraft and frequently result in excessive damage to the aircraft and loss of life or at least injury for some or all of the occupants. Obviously, conventional aircraft are not constructed to withstand the stresses of such landing operations. The inability to guide or to stabilize such aircraft, either transversely or longitudinally, during such emergency landing operations frequently results in the loss of propellers, motors, and wings due to engagement thereof with the ground or with the runways, and also frequently results in the "heeling-over" of the aircraft, and great damage to the aircraft.

It is therefore an object of this invention to provide an improved and relatively simple arrangement for the landing and take-off of aircraft; wherein the landing or take-off operation does not involve the use of retractable or moving parts on the aircraft; wherein there is provided an elongated and relatively narrow and elevated landing strip which includes, in the upper portion thereof, a longitudinally extending slide surface or surfaces of such a transverse cross section, as for example a V, as to possess major vertical and major horizontal components with respect to the width and height of the landing strip and which cross section of such slide surface or surfaces is complementary to a transverse cross section of an elongated and longitudinally extending under surface portion of the aircraft to be landed thereupon or to take-off therefrom, whereby to support and guide and stabilize the aircraft while sliding thereupon during such landing or take-off operations; wherein there is provided suitable means for heating, lubricating, and illuminating the improved landing strip and indicate directions for landing with respect thereto; wherein the landing strip may be formed in prefabricated sections which may include structural elements; wherein the landing strip may be adjusted to accommodate aircraft of different sizes; wherein the landing strip is provided with supplementary slide surfaces spaced laterally with respect to the mentioned V-shaped surface to coact with supplemental complementary support and stabilizing surfaces on the aircraft, whereby to provide increased transverse stability of the aircraft during landing or take-off operations; wherein the improved aircraft and the improved landing strip are provided with coacting means whereby to break the speed of the aircraft during landing operations and whereby to prevent the "heeling-over" or the aircraft; and wherein the improved landing strip is provided with removable ramp means to facilitate the removal of disabled aircraft from the landing strip.

A further object of this invention is the provision of suitable circulating means for circulating desired quantities and types of lubricants over different portions of the improved sliding surface of the landing strip, whereby to aid in controlling the sliding action of the aircraft during landing or take-off operations.

From the foregoing it will be apparent that the various new, novel and useful features of this invention, whereby to attain the foregoing objectives of this invention, possess the advantages of: relative simplicity; the avoidance of the use of movable or retractable parts, such as the conventional landing gear, in the landing or take-off operations of the aircraft; an easily producible landing strip which may be produced in prefabricated sections if desired and which may be made adjustable in width; the protection of the body, wings, propellers and motors of the aircraft during the landing and take-off operations; the stabilization, support and guidance of the aircraft during landing or take-off operations; the heating, lubricating and suitable illumination of the landing strip; and the control of the longitudinal movement of the aircraft, as for example, the reduction of the sliding speed of the aircraft, during landing operations.

The foregoing and other objectives, important new, novel and useful features and advantages of this invention will become more apparent and be more easily understood upon examination of the following description thereof and the accompanying drawings and appended claims. It should, however, be remembered that, without desire of limitation, the invention will be described and illustrated as the preferred embodiment of the invention in an improved arrangement for landing an aircraft. Certain changes and variations in the invention may, upon review of this application, suggest themselves to those skilled in the pertinent arts, which changes may, however, not depart from the spirit of this invention and may come within the scope of the appended claims.

In the accompanying drawings:

FIGURE 1 is a perspective view, partially illustrative, of the improved landing strip illustrating the V-shaped and supplemental sliding surfaces, the illuminating, heating and lubricating arrangement, the illustration representing the lubricant circulating unit and the heat and light control unit, the expanded entrance end of the landing strip, and the removable ramps at the exit end of the landing strip;

FIGURE 2 is a vertical transverse sectional view taken along lines 2—2 of FIGURE 1;

FIGURE 3 is a vertical transverse sectional view of a modified form of the landing strip shown in section in FIGURE 2, and illustrates the supplemental nose wheel accommodating groove in the runway;

FIGURE 4 is a vertical transverse sectional view of a further modified form of the landing strip shown in FIGURE 2, with one of the sliding surfaces adjustably supported for lateral movement with respect to the fixed sliding surface;

FIGURE 5 is a side elevational view, partially in broken away section taken along line 5—5 of FIGURE 4, showing the modified landing strip shown in transverse cross section in FIGURE 4, and illustrating one form of mechanism for adjustably mounting the movable sliding surface of the landing strip;

FIGURE 6 is a bottom plan view of a propeller powered aircraft provided with the improved lower supporting surface extending longitudinally of the aircraft together with the supplemental stabilizing and support surfaces aligned with the wings of the aircraft;

FIGURE 7 is a perspective view of a jet powered aircraft similar to the view of the propeller powered aircraft shown in FIGURE 6;

FIGURE 8 is a view similar to that shown in FIGURE 7, but in which the aircraft is not provided with the supplemental stabilizing and support surfaces;

FIGURE 9 is a perspective view of a propeller driven aircraft generally in a position of flight and provided with the improved lower supporting surface;

FIGURE 10 is a perspective view of a jet driven aircraft having the improved lower supporting surface seated in a section of the improved landing strip which has a complementary V-shaped groove in its upper surface;

FIGURE 11 is a perspective view of a jet powered aircraft having the improved lower supporting surface seated in a modified section of the improved runway which has a complementary V-shaped main sliding surface portion and a supplemental lower groove for accommodating the nose wheel of an aircraft;

FIGURE 12 is a front perspective view of a propeller powered aircraft, provided with the improved V-shaped lower supporting surface which is shown seated in a complementary groove in the upper surface of the improved elevated runway;

FIGURE 13 is a side perspective view of an aircraft having the improved lower supporting surface and provided with a hook-like element for engagement with the complementary braking mechanism of the improved runway;

FIGURE 14 is an illustrative transverse sectional view taken generally along line 14—14 of FIGURE 8, and showing the general outline of the cross section of the fuselage of the aircraft provided with the improved lower supporting surface;

FIGURE 15 is an illustrative transverse cross sectional view taken generally along line 15—15 of FIGURE 7, and showing the general outline of the cross section of the fuselage of the aircraft provided with the improved lower supporting surface and the supplemental and laterally extending stabilizing and support surfaces in supporting position with respect to the dotted line representation of the improved runway; and FIGURE 16 is an illustrative transverse cross sectional view of a modified form of supporting surface for the lower portion of an aircraft, wherein the V-shaped surface is inverted and the improved runway is fabricated of structural members having the complementary inverted V-shaped sliding surface extending lengthwise along the upper portion of the runway.

Referring to the drawings, in which like elements are identified by like numerals, 20 represents generally the improved runway or landing strip which may, if desired, be made of concrete or like material as shown in FIGURE 1, or may be made of fabricated structural elements 21 as shown in FIGURE 16. The improved runway is of a sufficient length to permit the landing or take-off sliding operation of the aircraft. The runway 20, as stated, may be constructed of concrete or like material as shown in FIGURE 1, or it may be fabricated of structural elements as shown in FIGURE 16 and suitably surfaced, as for example, with sheet metal. The improved runway may, if desired, also be constructed in prefabricated sections 22, as also shown in FIGURE 1, wherein the sections 22 are operatively joined end to end in any suitable manner. The adjacent ends of sections 22 are provided with rounded edges 23 to prevent the presentation of any sharp edges or corners in the sliding surfaces of the runway.

Runway 20 is preferably of a generally rectangular, transverse cross section and is of a width substantially equal to or slightly less than the maximum transverse width of the fuselage of the aircraft, and of a width which is appreciably less than the spacing between the nearest engines or motors and/or propellers or landing gear carried on the wings of the aircraft. The height and the width of the runway 20 is such that the wing tips, engines, propulsion motors, propellers and landing gear of the aircraft cannot engage the ground or the runway during landing or take-off operations.

The upper surface of runway 20 is comprised of two longitudinally extending and flat and substantially horizontal and horizontally spaced and substantially rectangular and coplanar surfaces 24 and 25 which have parallel side edges and which define the two outer edge portions of the top of runway 20. The remainder of the upper surface of runway 20 is comprised of a longitudinally extending and generally horizontally disposed and preferably V-shaped or trough-shaped groove 26 having defining side walls 27 and 28, each of which walls 27 and 28 is planar and substantially rectangular and defined by straight and parallel upper and lower side edges. The side walls 27 and 28 and the flat surfaces 24 and 25 comprise sliding surfaces for support, stabilization and guidance of the aircraft in groove 26, which groove 26 has its minimum transverse cross sectional dimension spaced from its maximum transverse cross sectional dimension by a distance equal to at least one-half of the vertical dimension of such cross section. Although the open top groove 26, which has its largest transverse cross sectional dimension at the top and varies uniformly in cross sectional width down to its minimum width at its downwardly directed apex portion, and which is defined along its side walls by the wall portions or surfaces 27 and 28, each of which is planar and the planes of which intersect in a straight horizontal line, and which groove 26 has been illustrated as being V-shaped in transverse cross section, obviously other shapes may be usable in such groove and it is not intended to limit the present invention to a V-shaped groove or V-shaped space 26 as defined by the straight walls 27 and 28. The upper edges of the substantially rectangular walls 27 and 28 join the adjacent inner parallel edges of the rectangular stabilizing and support slide surfaces 24 and 25 and define the upper extremities of the trough 26, while the joined lower edges of the side walls 27 and 28, all as shown in FIGURES 1 and 2, form the apex of the V-shaped and horizontally disposed groove or slideway space 26.

To facilitate the landing of aircraft the entrance end of the landing strip 20 is slightly flared and downwardly rounded at 29. To facilitate the removal of aircraft from the landing strip 20, movable ramps 30 are provided at the opposite sides of the exit end of the landing strip 20. Ramps 30 are adapted for use in engaging the conventional landing gear 31 of the aircraft 32 to support the aircraft during the operation of removing the aircraft from the runway 20. As the wheels of the landing gear 31 engage ramps 30, the body of the aircraft 32 will be raised from the runway 20, whereafter the aircraft may be moved onto suitable supports or onto a conventional runway or the like.

Runway 20 is provided in its parallel upper flat surfaces 24 and 25 with two parallel rows of recessed lamps of the reflector type, suitably connected through ducts 34 to control unit 35. Lamps 33 are so connected for actuation, and are of such type, as to supply required illumination and guidance for the pilots of the aircraft during landing and take-off operations and are also so connected to control unit 35 that at least some of the lamps may be operated, for example, in linear sequence, to indicate the direction in which a landing of the aircraft is to be made on the runway 20.

Runway 20 is also provided in side walls 27 and 28 of groove 26 with spaced and recessed spray devices 36 for spraying suitable lubricants, such as water, oil, fire prevention foams, etc. onto the sliding surfaces 24, 25, 27 and 28. Sprays 36 are recessed into surfaces 27 and 28 sufficiently to prevent engagement thereof by the aircraft during landing operations. Sprays 36 are suitably connected, through ducts 34, to the control unit 35 for operation in the manner indicated above. A series of recessed sumps 37 are provided in the apex portion of groove 26 and are also suitably connected, through ducts 34, to control unit 35 for receiving any excess material sprayed onto surfaces 27 and 28, for recirculation thereof through the sprays 36 or for discharge, as desired. To facilitate the normal flow of excess sprayed material from surfaces 27 and 28 to the sumps 37, the runway 20, and particularly the groove 26 is slightly tilted toward the entrance end of runway 20. The plurality of sumps 37 enables the use of different types of lubricants on different sections of the slide surfaces 24, 25, 27 and 28, which surfaces may, if desired, also be provided with a permanent type of lubricant. For example, the lubricant used on the slide surfaces near the entrance end of the runway 20 may be such as to provide good lubrication of those surfaces, while the lubricant used near the exit end of the runway 20, particularly when the runway is being used in an aircraft landing operation, may be such as to possess poor lubricating qualities, and thereby tend to aid in stopping the aircraft. Obviously, the inner surfaces of the portions or side walls 27 and 28 of groove 26 may be surfaced with suitable materials, as for example treated wood, sheet metal, macadam, or a combination of such or other suitable materials to provide the desired lubricating effect when suitable lubricant is applied to such surfaces for a landing or a take-off operation, or to provide the desired frictional effect.

To regulate the temperature of runway 20, suitable attempering means 38, as for example a conduit for the circulation of attempering medium, is included in the runway 20 adjacent the apex of groove 26. Attempering means 38 is also suitably connected for controlled operation to the control unit 35.

As shown in FIGURE 1, the improved runway 20 is also provided adjacent its entrance end with a series of retractable or collapsible elements, as for example hinged eyelets or rings, which are operatively connected to suitable tensioning means such as a controlled tensioning means such as a cable or the like (not shown), which tensioning means may in turn be operatively controlled from the control unit 35 for the regulation of the movement of the elements 39. Elements 39 are adapted, during landing operations of an aircraft, to engage, for example, a hook-like element 40 carried on the lower portion of the aircraft near the rear extremity thereof, whereby to enable the braking of the speed of the aircraft and to prevent possible end-over-end tilting of the aircraft during the landing operations.

The modified form of the improved runway 20 illustrated in transverse cross section in FIGURE 3, and also shown in FIGURE 11, includes a supplemental groove 41, formed at the apex of groove 26 for the accommodation of a non-retracted nose wheel 42 of a landing aircraft.

The modification of the landing strip 20 as shown in FIGURES 4 and 5 includes a laterally movable upper portion 43 including the surfaces 24 and 27. Part 43 is mounted on guiding and supporting elements, such as tongue and groove slide elements 44, and is provided with rack means 45, engaging actuating pinions 46, carried by shaft 47, whereby to laterally move the portion 43. As thus constructed, groove 26 may be adjusted in width to accommodate aircraft of different widths.

As is clearly shown in FIGURES 6 to 15, the aircraft 32 is provided on its underside or lower portion of the fuselage with an elongated and longitudinally extending and satisfactorily reinforced and suitably covered support surface 48 which may be added to an aircraft or may be embodied in the structure thereof in the first instance. The reinforced surface 48 is preferably of a V-shaped transverse cross section, when intended for use in connection with a V-shaped groove 26 in landing strip 20. Support surface 48 includes the side walls 49 and 50, joined along their inner edges to form a flat and straight apex for the V-shaped support surface 48 formed primarily of the walls 49 and 50, which comprise tough side walls adapted to withstand great stress and friction.

Walls 49 and 50 are complementary to the surfaces 27 and 28 of groove 26. The width of groove 26 and the width of the support surface 48 are such as to provide the maximum transverse latitude for a pilot in landing the aircraft on the runway 20, it being only necessary for the pilot to guide the downwardly directed apex of the surface 48 into the wide open portion of groove 26, whereafter the aircraft will automatically be centered in groove 26 by the engagement of the sides 27 and 28 of groove 26 with the sides 49 and 50 of support surface 48. The vertical and horizontal dimensions and stress absorbing structure of groove 26 and of support surface 48 are such as to provide the maximum vertical and maximum horizontal components of such dimensions and the maximum stress absorbing ability or characteristics thereof, whereby to support, guide and transversely and longitudinally stabilize the aircraft 32 during landing and take-off operations.

Although the weight of the aircraft will tend to maintain the support surface 48 seated in groove 26 during landing and take-off operations, any tendency of the aircraft to tilt transversely would tend to produce a transverse wedging of surface 48 in groove 26, thereby stabilizing the aircraft against further transverse tilting. To further stabilize the aircraft transversely and to protect the aircraft 32, particularly the underside of the inner ends of the wings, reinforced supplemental support surfaces 51 and 52 are provided immediately below the wings of the aircraft and are joined to the opposite upper edges of the support surface 48. Supplemental support surfaces 51 and 52 are adapted to slidingly engage the underlying slide and stabilizing surfaces 24 and 25 on the landing strip 20. The lateral extension of the elements 51 and 52 from support surface 48 and the engagement of such supplemental surfaces with the horizontal and laterally spaced slide surfaces 24 and 25, will greatly increase the transverse stability of the aircraft during landing or take-off operations and also further insure the prevention of engagement of the ground by the wings, engines or propellers of the aircraft. The elongated and longitudinally extending and substantially horizontally disposed apex of the V-shaped surface 48 insures the longitudinal stability of the aircraft when seated on the runway 20 with the surface 48 seated in groove 26.

The modification of the improved landing and take-off device for the aircraft as illustrated in FIGURE 16 differs from that shown in FIGURE 1 in that the support surface 53, in the lower portion of the aircraft has a transverse cross section generally in the shape of an inverted V, complementary to the inverted V-shaped slide surface 54 on the upper portion of the modified landing strip 20 of FIGURE 16. In this modification of the landing strip 20, the landing strip is formed of structural sections 21, as for example metal sections, instead of the masonry sections shown in FIGURE 1. The slide surface of the modified runway of FIGURE 16 may be formed of suitable sheeting, such as metal sheeting.

In the use of the improved runway 20, as for example, in a landing operation, the landing strip 20 is suitably illuminated, lubricated and attempered, if desired and necessary, all in the manner as above described, and it is then only necessary for the pilot of the aircraft to fly the aircraft directly and very low over the runway 20, longitudinally aligning the apex of the reinforced landing surface 48 with the upper portion of groove 26, and then lowering the aircraft until the support surface 48 enters and settles into the groove 26, whereafter the engagement of the surface 48 with the walls of the groove 26 will stabilize, guide and support the aircraft as it slides to a stop on the runway 20, or as it is stopped by the braking mechanisms 39 and 40 which may or may not be aided, as desired, by the use of suitable lubricants or friction producing materials sprayed onto all or only onto part of the support surfaces 24, 25, 27 and 28. The lubricants and/or friction controlling materials supplied through the sprays 36 to the surfaces 24, 25, 27 and 28, may thus be used to aid in controlling the landing as well as take-off operations. In a take-off operation the aircraft is similarly stabilized, guided and supported as the support surface 48 slides in the groove 26 until the aircraft is airborn. During such landing or take-off operations, the aircraft is supported and guided and stabilized on the relatively narrow runway 20 so that, as shown in FIGURES 10 and 12, the engines 55 and propellers 56 of the aircraft 32 are clear of the ground and also clear of the sides of the runway 20. In the normal use of the improved runway 20, it is also possible, if desired, to provide the surfaces 24, 25, 27 and 28 with a permanent lubricant 57, generally indicated in FIGURE 3.

Obviously, the transverse cross sectional shape of the groove 26 and the complementary support surface 48 need not necessarily be in the preferred form of a V, but may also be of any other suitable form and suitably covered, if desired, so as to provide the mentioned necessary support, guidance, stabilizing and easy aligning advantages and characteristics provided by the V-shaped complementary surfaces.

From the foregoing description of this invention and from the accompanying drawings, it will be apparent that this invention realizes the introductorily enumerated objectives respecting the improved aircraft landing device. It will similarly be apparent that the invention possesses the hereinbefore listed advantages and provides new, novel and useful improvements in aircraft landing devices.

Having thus described and illustrated the preferred embodiments of this invention, the invention is not to be interpreted as being restricted to the specifically illustrated and described embodiments, as set forth in the drawings and as hereinbefore described, except insofar as is necessitated by the appended claims and the disclosures of the prior art.

The invention is hereby claimed as follows:

1. In combination, an aircraft landing slideway, a winged aircraft having an elongated fuselage, characterized by the fact that said slideway is elongated and rigid and elevated above the adjacent surfaces underlying the outer ends of the wings of said aircraft and that the lower surfaces of said fuselage is rigid and includes as a major portion thereof elongated support surface means extending longitudinally of said fuselage along a major portion of the length of said fuselage and having a transverse cross section which has major vertical and major horizontal components and which has its maximum width at one vertical extremity of such vertical component and which has its minimum width at the opposite end of such vertical component, and further characterized by the fact that said landing slideway is substantially rigid and of a maximum width substantially equal to the maximum width of said fuselage and is elongated and includes in its upper portion elongated and straight slide surface means extending longitudinally of said slideway and having a transverse cross section the upper edge of which is complementary to the adjacent lower edge of the cross section of said support surface means, said slide surface means being so constructed and arranged so as to receive in closely seated sliding engagement the complementary and adjacent faces of the support surface means of said fuselage, whereby to guide and support said aircraft and stabilize said aircraft against transverse tilting during landing of said aircraft upon said landing slideway.

2. In combination, an aircraft having an elongated fuselage, an elongated landing surface for aircraft, said landing surface being rigid and elevated above the surrounding surfaces immediately adjacent the path of travel of a landing aircraft and being of a width substantially equal to the maximum width of the fuselage of the aircraft, said fuselage having along a major extent of its underside an elongated support surface complementary to said landing surface and adapted for seating engagement therewith, said support surface and said landing surface at the locus of engagement therebetween having major vertical and major horizontal components adapted respectively to absorb horizontal and vertical thrust developed intermediate said support surface and said landing surface upon the landing of the aircraft upon said landing surface with the support surface in complementary seating engagement with said landing surface, the engaging faces of said landing surface and said support surface having complementary transverse cross sections each of which cross sections has its maximum width at one vertical extremity thereof and has its minimum width at the opposite vertical extremity thereof, said support surface and said landing surface being so constructed and arranged whereby to guide and support said aircraft and stabilize said aircraft against transverse tilting during landing of said aircraft upon said landing surface.

3. Apparatus for facilitating the landing and taking off of aircraft having an elongated fuselage and having transversely extending wings and landing gear depending from said wings, comprising, in combination, elongated and straight and rigid and elevated landing runway means disposed substantially horizontally above the ground an appreciable distance compared to the distance by which the wings of the aircraft are spaced from the ground when the aircraft is supported on the ground by its landing gear, said landing runway means being of a width less than the transverse spacing of said landing gear and including elongated sliding surface means extending longitudinally along the upper portion of said runway means, said sliding surface means defining a space having a transverse cross section of varying width the greatest horizontal dimension of which is spaced from its smallest horizontal dimension by a distance equal to at least half of the vertical dimension of said space, and elongated support surface means comprising a major portion of the underside of said fuselage and being complementary in transverse cross section to the cross section of said space defined by said sliding surface means and adapted to have the under face of said support surface means snugly seated against the upper face of said sliding surface means, whereby to support and guide the aircraft and stabilize the aircraft against transverse tilting during the operation of landing or taking off of the aircraft on said landing runway means.

4. A runway for aircraft having a fuselage, comprising, in combination, two elevated and parallel and elongated and flat and substantially horizontally disposed and horizontally spaced and rigid surface means disposed in the same horizontal plane, and elongated and straight and rigid trough-like surface means having substantially horizontally disposed upper edges parallel to and extending longitudinally of and intermediate and joining respectively adjacent complementary edges of said two horizontally disposed and horizontally spaced and rigid surface means, said runway being of a maximum width substantially equal to the maximum width of said fuselage.

5. A runway for aircraft, comprising, in combination, two parallel and horizontally spaced and rigid and elongated and substantially horizontal first surface means disposed in the same plane and at an elevation above the surrounding area immediately adjacent the path of travel of an aircraft landing or taking off on said runway, and elongated and rigid second surface means having upper edges parallel to and extending longitudinally with respect to adjacent complementary edges of said two first surface means and positioned intermediate said two first surface means said second surface means defining below the elevation of said first surface means a space having a transverse cross section of varying width the minimum width of which space is positioned from its maximum width by a distance equal to at least half of the vertical dimension of said space, said maximum width of said space comprising at least one-half of the width of said first surface means when combined with the maximum width of said space as projected into the plane of said first surface means.

6. A landing slideway surface for aircraft having a fuselage, comprising, an elongated and rigid trough-shaped slideway surface in combination with and engageable with the lower portion of the fuselage of an aircraft having an elongated surface extending longitudinally along the major portion of the underside of said fuselage and of a transverse across section complementary to the transverse cross section of said trough-like surface, said trough-like slideway surface having a maximum width which does not exceed the maximum width of said fuselage and being of a length at least several times greater than the length of said fuselage.

7. An aircraft fuselage having an elongated first landing support surface on its underside extending longitudinally along a major portion of the length of the underside of said fuselage, in combination with a complementary and elongated and rigid and straight second landing and sliding surface of a runway the maximum transverse horizontal dimension of which sliding surface is substantially equal to the maximum transverse dimension of said first landing support surface and which sliding surface is elevated above surfaces immediately adjacent the path of travel of said aircraft during a landing or take off operation and which sliding surface is of a length at least several times greater than the length of said fuselage.

8. In combination, an aircraft having an elongated fuselage provided along a major portion of the length of its underside with an elongated and longitudinally extending support surface forming an integral part of said fuselage, and an elongated and rigid slideway landing surface in the upper portion of an elevated runway, said landing surface being complementary to said support surface and of a width substantially equal to the width of said support surface and adapted for seating engagement therewith for supporting said fuselage and stabilizing said fuselage against lateral tilting and being of a length at least several times greater than the length of said fuselage.

9. A landing surface in a runway for aircraft having a fuselage, comprising, in combination, two elongated and rectangular and rigid and straight surfaces each of which is substantially planar and each of which has elongated and parallel upper and lower straight side edges, said surfaces lying in intersecting planes and having side edges parallel to the line of intersection of said planes and having the side edges nearest the line of intersection of said planes spaced from but closely adjacent to one another compared to the spacing between the opposite parallel side edges of said surfaces, said opposite parallel side edges being spaced one from another a distance less than the greatest width of the fuselage of said aircraft.

10. A landing surface for aircraft having an elongated fuselage, comprising, in combination, two elongated and rigid and rectangular and straight surface means each of which is substantially planar and each of which has elongated parallel upper and lower side edges, said two surface means lying respectively in two intersecting planes and each said surface means having an elongated side edge parallel to the line of intersection of said two planes, said surface means being adapted to slidingly engage complementary elongated surface means integrally formed with the fuselage of the aircraft and positioned on the underside of the fuselage of the aircraft, the greatest width of said surface means as thus arranged being less than the greatest width of the fuselage of said aircraft.

11. An aircraft having an elongated fuselage, characterized by the fact that the lower surface of said fuselage includes as a major portion thereof elongated and rigid support surface means extending longitudinally of said fuselage and having a transverse cross section which has major vertical and major horizontal components, said elongated surface means being adapted to be slidingly seated against complementary and rigid and elevated slideway surface means comprising a slideway for landing the aircraft and supporting the aircraft and stabilizing the aircraft against lateral tilting, said slideway surface means having a maximum width less than the maximum width of said fuselage and having a length at least several times greater than the length of said fuselage.

12. An aircraft according to claim 11, wherein said cross section has its maximum width at one vertical extremity thereof and has its minimum width at the opposite vertical extremity thereof.

13. An aircraft according to claim 11, wherein said transverse cross section outlines a space the cross section of which is in the general shape of a trough.

14. An aircraft according to claim 11, wherein said transverse cross section is in the general shape of a V.

15. A landing slideway for aircraft having an elongated fuselage, characterized in that the slideway includes in its upper portion elongated and rigid and straight slide surface means extending longitudinally of said slideway a distance at least several times greater than the length of said fuselage and having a transverse cross section which has major vertical and major horizontal components and which includes at least two spaced and straight surfaces which lie in separate and intersecting planes and which straight surfaces have parallel upper and lower edges, said elongated slide surface means being adapted to slidingly engage in closely seated arrangement complementary support surface means comprising a major elongated and rigid portion of the lower surface of the fuselage of said aircraft, the maximum width of said fuselage being greater than the maximum width of said slide surface means.

16. An aircraft landing slideway according to claim 15, wherein said transverse cross section of said slide surface means has its maximum width at one vertical extremity thereof and has its minimum width at its opposite vertical extremity.

17. An aircraft landing slideway according to claim 15, wherein said transverse cross section of said slide surface means is generally in the shape of a trough, and wherein said slideway is provided with controllable lighting means for lighting said slideway and wherein said slideway is provided with controllable attempering means for attempering said slideway and wherein said slideway is provided with controllable friction medium supply means for supplying friction controlling medium to the upper surface of said slideway, and wherein said transverse cross section which is generally in the shape of a trough may be adjusted in width.

18. An aircraft landing slideway according to claim 15, having distributing means for distributing a friction controlling medium over said slide surface means, collecting means for collecting the excess of the thus distributed friction controlling medium which drains from said slide surface means, and circulating means for circulating the friction controlling medium from said collecting means for collecting the excess friction controlling medium to said means for distributing the friction controlling medium.

References Cited in the file of this patent

UNITED STATES PATENTS

| | | |
|---|---|---|
| 1,811,152 | Procofieff-Seversky | June 23, 1931 |
| 2,197,300 | Fleet et al. | Apr. 16, 1940 |
| 2,234,750 | Fleet et al. | Mar. 11, 1941 |
| 2,433,238 | Ramirez | Dec. 23, 1947 |
| 2,436,240 | Wiertz | Feb. 17, 1948 |
| 2,634,659 | Jordanoff | Apr. 14, 1953 |
| 2,814,453 | Trimble | Nov. 26, 1957 |

FOREIGN PATENTS

| | | |
|---|---|---|
| 502,883 | Belgium | May 15, 1951 |
| 742,240 | Great Britain | Dec. 21, 1955 |